Jan. 22, 1924.
C. S. KELLUM
GAUGE
Original Filed Dec. 3, 1919
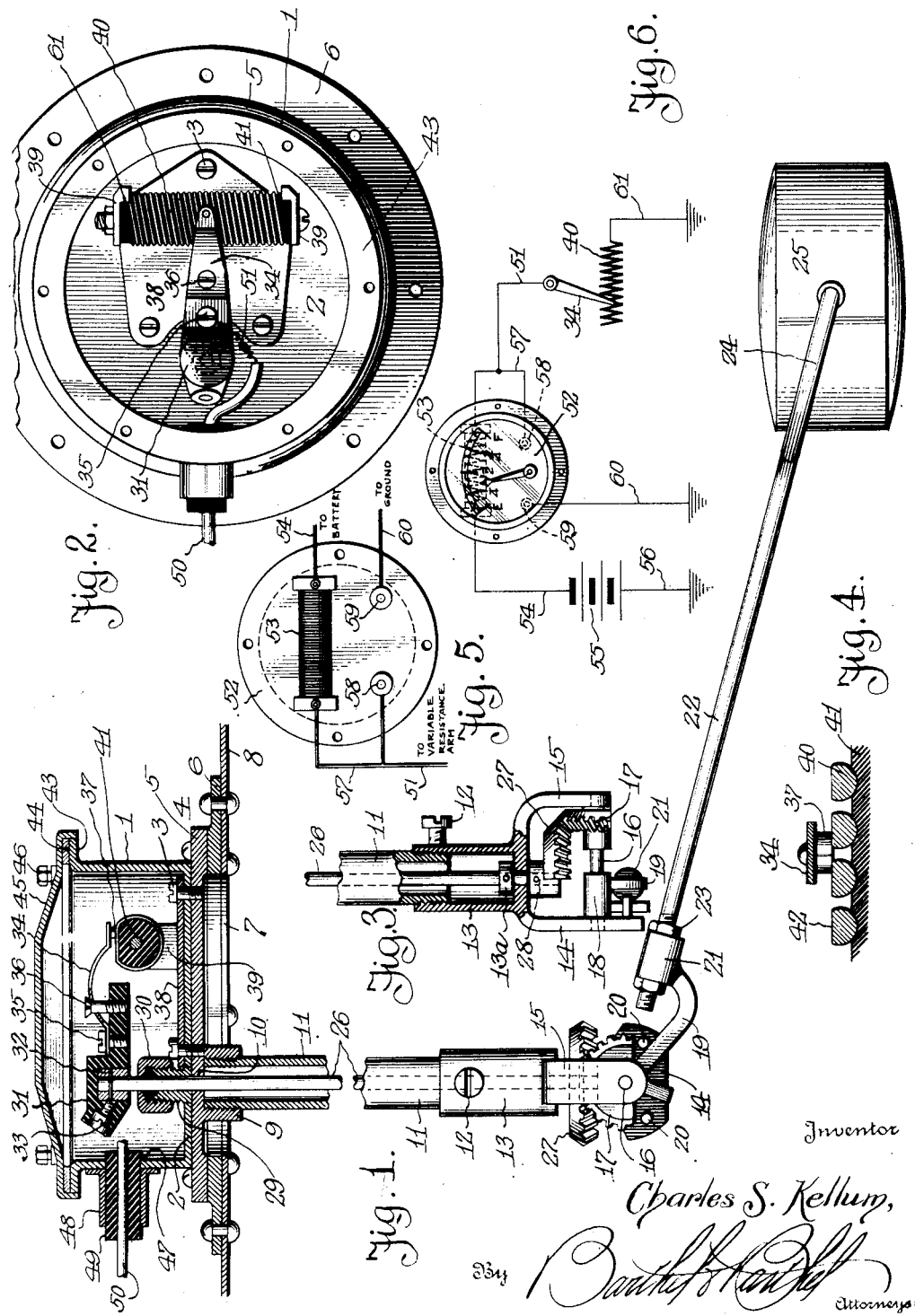
Inventor
Charles S. Kellum, Patented Jan. 22, 1924.

1,481,322

UNITED STATES PATENT OFFICE.

CHARLES S. KELLUM, OF DETROIT, MICHIGAN.

GAUGE.

Application filed December 3, 1919, Serial No. 342,178. Renewed June 15, 1923.

*To all whom it may concern:*

Be it known that I, CHARLES S. KELLUM, a citizen of the United States of America, residing at Detroit, in the county of Wayne and State of Michigan, have invented certain new and useful Improvements in Gauges, of which the following is a specification, reference being had therein to the accompanying drawings.

In using electricity in connection with an instrument associated with any volatile liquid, as gasoline, kerosene or any automobile fuel, it is essential that there be a small consumption of current not only to save electricity, but to insure a small difference in potential and thus avoid sparks which are liable to cause a detonation of volatile vapor or the liquid itself. As a matter of fact, the Underwriter's Association will not pass or recommend any such instrument unless it is positively vapor, moisture and foolproof. It is therefore believed that any gauge or indicating instrument for volatile liquid that can be safely used is a valuable contribution to the art.

My invention not only aims to provide a gasoline gauge which has been thoroughly tested and met with safety requirements, but aims to provide an electromechanical device for registering quantities or surface level of fluids either totally confined as in a covered tank, or with exposed surface where registration is required at the tank or at a point remote therefrom, which possesses characteristics from a manufacturer's standpoint that may be noted as follows.

First, the gauge includes a casing adapted to be fixed to a gasoline tank or receptacle and the construction of the casing is such that the interior thereof, which contains electrical devices, is positively insulated and sealed from the interior of the gasoline tank, and from the outside air so that it is impossible for gasoline vapors or moisture to enter the casing, consequently there is no danger of ignition within the casing even though a spark should exist.

One of the electrical devices within the casing is a novel resistance coil, which is connected in circuit with an external resistance of such proportion that it is impossible to produce a spark within the casing. The coil of the device is adapted for use in connection with a six volt storage battery and the maximum power consumption is approximately .438 watts, and aside from the small consumption of current a coil is constructed to reduce and practically eliminate vibration of the contact member which is movable relative to the coil to vary the resistance.

Third, the indicator is of the float actuated type and a swiveled float is employed which is prevented from impinging against the top and bottom of the gasoline tank and consequently is prevented from being injured by the rough travel of any automobile equipped with the gauge.

Fourth, that the gauge is designed to include a broad field of registration for liquid, whether held in storage as in a tank, reservoir or flowing through channels natural or artificial, so long that the flow is not turbulent, and since the indicator is electrically operated it is possible to obtain reading at a point very much remote from the liquid.

The above are only a few of the principal features of my invention and others will appear hereinafter when considering the construction in connection with the drawing, wherein—

Figure 1 is a front elevation of the gauge, partly broken away and partly in section;

Fig. 2 is a plan of the gauge casing;

Fig. 3 is a side elevation of the lower portion of the gauge;

Fig. 4 is an enlarged detail sectional view of a portion of a resistance coil;

Fig. 5 is a rear elevation of the dial or indicator casing, and

Fig. 6 is a diagrammatic view showing the front elevation of the dial or indicator casing.

While the construction which I am about to describe has been tested and found satisfactory, nevertheless I do not care to confine my invention to the precise construction and arrangement of parts shown or described, other than defined by the appended claims.

In the drawing, the reference numeral 1 denotes a cylindrical casing having a bottom wall 2 connected by screws 3 or other fastening means to a base plate 4 and said base plate is adapted to be connected by screws 5 or other fastening means to the usual flange 6 which surrounds an opening 7 in the tank wall 8, the flange 6 being riveted or otherwise connected to the tank wall.

The base plate 4 is provided with a depending socket 9 and an opening 10 centrally of said socket. In the socket 9 is screwed or otherwise mounted the upper end of a tubular upright 11, and fitted on the lower end of the upright and retained thereon by a screw 12 or other fastening means is a gear housing 13 provided with depending arms 14 and 15 in which is journaled a rock shaft 16. On the shaft 16 between the arms 14 and 15 is a sector gear 17 and a sleeve portion 18 of a bell crank 19, said bell crank being located at the arm 14 so that said bell crank may impinge against stop pins 20 carried by the arm 14, said stop pins limiting the action of the bell crank 19 and consequently the rocking movement of the shaft 16.

The bell crank 19 has a sleeve portion 21 for the inner end of a float arm 22, said arm having its inner end adjustably held relative to the bell crank sleeve 21 by nuts 23 on the float arm against the ends of the sleeve 21. The outer end of the float arm 22 is bifurcated or provided with a fork 24 in which is swiveled a float 25, preferably made of copper and swiveled so that it may compensate for any surface slop in a tank in which the float is placed; the opening 7 in the tank wall 8 being of sufficient size to permit of the float passing therethrough when installing the gauge. The float is prevented from impinging against the top and bottom of the tank by means of the stop pins 20 of the gear housing 13, consequently the float cannot be injured during rough travel of an automobile equipped with the gauge.

In the tubular upright 11 and incased thereby is a drive shaft 26 which has its lower end provided with a sector gear 27 meshing with the sector gear 17, and the hub 28 of the sector gear 27 is held against vertical movement by a collar 13ᵃ on the shaft 26 within the housing 13. The upper end of the drive shaft 26 extends through the opening 10 of the base plate 4 and through a stuffing box 29 mounted in the bottom wall 2 of the casing 1, said stuffing box having a gland 30 to insure a non-leakable bearing for the upper end of the drive shaft.

On the upper end of the drive shaft 26 within the casing 1, is a head 31 made of insulation, for instance bakelite, said head being set down over a bushing or enlargement 32 on the end of the drive shaft. The head 31 may be held by a set screw 33, and mounted on said head is the inner end of a bowed resilient arm 34, preferably made of bronze. The inner end of the arm 34 is held in engagement with the head 31 by a terminal screw 35, and adjacent this screw is another screw 36 which may be adjusted to increase the tension of the resilient arm 34. At the outer end of the arm 34 is a flat contact point 37, the purpose of which will hereinafter appear.

The screws 3 or fastening means employed for retaining the bottom wall 2 of the casing 1 in engagement with the base plate 4 may also be employed for holding the base 38 of resistance coil supports 39 which has a resistance coil therebetween constantly engaged by the contact point 37 of the resilient arm 34. The resistance coil is designated 40 and is wound on an insulated core 41, preferably made of bakelite, said core being supported between the supports 39 with the convolutions of the coil engaging in the periphery of the core 41, as shown in the detail sectional view Fig. 4. This view also brings out the fact that the top of the resistance coil is flattened, as at 42, so that each convolution will present a facet on to which the contact point 37 of the resilient arm 34 may easily move. With the facets of the coil convolution all in the same plane, which may be accomplished by grinding down the convolutions of the coil after it is wound, there is no rise and fall of the contact point 37 when passing from one convolution to another, consequently there is no vibration of the resilient arm 34 as might occur when riding on to and off of rounded surfaces such as would be provided by the coil if not formed as herein stated. The flattened surface of the coil also insures a better and more positive contact between the convolutions of the coil and the contact point 37, and there is positively no danger of the sparking as the contact point 37 is shifted over the coil.

As shown in Fig. 1, the core 41 has a flattened wall over which the coil convolutions are carried and this flattened wall provides a firm mounting for the flattened portions of the coil, but in some instances the core may be cylindrical and simply the coil convolutions flattened by being ground after the coil is assembled on the core.

The casing 1 has its upper end provided with an annular flange 43 and seated on said flange is a gasket 44 retained thereon by a cover 45 which fits down over said gasket and the flange 43 and is attached to said flange by screws 46 or other fastening means.

The side wall of the casing 1, adjacent the head 32, is provided with an opening 47 and a protruding sleeve 48, said sleeve containing an insulator 49 that extends into the casing 1 and may be conveniently made of bakelite. Extending through the insulator 49 is a conduit 50 for a leading-in wire 51 which is attached to the terminal screw 35, and reference will now be had to Figs. 5 and 6 to show the gauge and its wiring in connection with a conventional form of indicator 52. The indicator 52 is preferably a high grade of milliammeter which has its dial calibrated to indicate, in connection with a pointer, when the tank is empty or full, and the volume of fuel between the two stages, so that when this indicator is located on the instrument board or dash of an automobile it will be possible for the chauffeur or driver of the automobile to determine the quantity of gasoline contained within the fuel tank, whether it be under the cowl, seat or in the rear of the car. In either instance, the operator of the automobile can determine by observation the amount of fuel in the tank, thus obviating the necessity of leaving the driver's seat to note the condition of the fuel tank.

The rear wall of the indicator 52 is provided with a resistance coil 53 of about ninety ohms and this coil is connected by a wire 54 to a battery 55 of about six volts, said battery being grounded by a wire 56. The resistance coil 53 is also connected by a wire 57 to a terminal 58 of the indicator 52 and said wire is connected to the leading-in wire 51 of the gauge. Another terminal 59 of the indicator is connected by a wire 60 to the ground, and with the variable resistance coil 40 grounded, as at 61, there is an electrical circuit in connection with the indicator 52 and the gauge with a very small consumption of current due to an exceedingly small difference in potential. It is through the medium of the variable resistance coil that the gauge may indicate minute quantities of fuel within the tank, and with the casing 1 positively sealed relative to the tank wall 8, there is no danger of fuel vapor or moisture entering the casing 1, accumulating therein, and endangering the use of the gauge. However, even should there be leakage into the casing 1 there is that safety factor of no sparks whatsoever within the casing, consequently the gauge is double proof against any electrical disturbances induced by a volatile liquid or vapor.

I desire to direct attention to the fact that the hub 28 of the sector gear 27 which forms a part of the float actuated mechanism prevents fuel from splashing into the tubular upright 11 by reason of the hub closing the lower end of the housing 13, and should any vapor enter the tubular upright it is then barred from entering the casing 1 by the stuffing box surrounding the drive shaft. Also, from a manufacturing standpoint, the flange 6, base plate 4 and bottom wall 2 of the casing 1 may be made integral with the resistance coil supports 39 suitably connected thereto.

What I claim is:—

1. In an electric gauge, a resistance coil having closely wound convolutions providing facets all in a common plane and on which a contact point may move.

2. A resistance coil comprising a core having a facet, and a piece of wire wound about said core with the facet engaging portions of the wire provided with facets in a plane parallel to the facet of said core.

3. As a new article of manufacture, a coil having its convolutions ground to provide a flat contact surface for a contact point.

4. A resistance coil comprising a cylindrical core having a longitudinally disposed facet, and convolutions of wire about said core presenting a flat coil contact face.

In testimony whereof I affix my signature in the presence of two witnesses.

CHARLES S. KELLUM.

Witnesses:
KARL H. BUTLER,
ANNA M. DORR.